(12) United States Patent
Ogawa

(10) Patent No.: US 8,300,364 B2
(45) Date of Patent: Oct. 30, 2012

(54) HEAD SUSPENSION HAVING A JUMPER CONFIGURED WITH AN ESCAPE RECESS FOR PROTECTING AN INSULATING COVER LAYER OF THE JUMPER FROM BEING ABRADED BY AN EDGE OF A BASE PLATE

(75) Inventor: Hidenori Ogawa, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 402 days.

(21) Appl. No.: 12/652,834

(22) Filed: Jan. 6, 2010

(65) Prior Publication Data

US 2010/0182721 A1 Jul. 22, 2010

(30) Foreign Application Priority Data

Jan. 16, 2009 (JP) ................................. 2009-008026

(51) Int. Cl.
*G11B 5/55* (2006.01)
(52) U.S. Cl. .................................. 360/245.9; 360/294.4
(58) Field of Classification Search ............... 360/245.9, 360/294.4
See application file for complete search history.

(56) References Cited

U.S. PATENT DOCUMENTS 7,466,519 B2 * 12/2008 Wakaki et al. ............. 360/245.9
8,154,827 B2 * 4/2012 Contreras et al. .......... 360/264.2

FOREIGN PATENT DOCUMENTS

JP 2002-050140 2/2002
JP 2002-197819 7/2002

* cited by examiner

*Primary Examiner* — Allen Heinz
(74) *Attorney, Agent, or Firm* — Jordan and Hamburg LLP

(57) ABSTRACT

A head suspension including a base plate, a load beam, an actuator element to be deformed to move the load beam relative to the base plate, and a jumper having a first end electrically connected to the actuator element, an intermediate part extending over a base plate edge of the base plate, and a second end electrically connected to a flexure, to supply power from the flexure to the actuator element. The jumper is composed of an insulating cover layer, a conductor layer, an insulating layer, and a metal layer that are laid one on another. The conductor layer is diverged in a direction in which the layers of the jumper are laid one on another, to form an escape recess to avoid an edge of the base plate edge to protect the insulating cover layer of the jumper from being abraded by an edge of the base plate.

5 Claims, 5 Drawing Sheets

HEAD SUSPENSION HAVING A JUMPER CONFIGURED WITH AN ESCAPE RECESS FOR PROTECTING AN INSULATING COVER LAYER OF THE JUMPER FROM BEING ABRADED BY AN EDGE OF A BASE PLATE

BACKGROUND OF THE INVENTION

1. Field of the Invention

The present invention relates to a head suspension having a base plate, a load beam, and an actuator element to move the load beam relative to the base plate.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

In particular, the magnetic disk drives are rapidly expanding market and improving performance, and accordingly, are strongly needed to increase their storage capacities. Increasing the storage capacity of a magnetic disk drive is achievable by increasing the storage capacity of each magnetic disk contained in the magnetic disk drive.

The storage capacity or recording density of a magnetic disk will increase, without changing the diameter thereof, if the number of tracks per inch (TPI) on the magnetic disk is increased.

For this, a magnetic head of a head suspension installed in the magnetic disk drive must conduct a precise positioning operation in a direction across the tracks, i.e., a sway direction. For realizing the precise positioning operation, an actuator capable of accurately moving and positioning the magnetic head in a very small area is needed.

Head suspensions adopting precise positioning actuators are disclosed in Japanese Unexamined Patent Application Publications No. 2002-50140 and No. 2002-197819.

According to these related arts, the head suspension has a base plate, a load beam, and an actuator element that is energized to move the load beam in a sway direction relative to the base plate. The load beam is provided with a flexure having wiring. The wiring of the flexure is electrically connected through, for example, wire bonding to the actuator element.

The wire bonding, however, restricts the degree of freedom in choosing a connecting direction between the actuator element and the flexure.

To widen the degree of freedom in choosing a connecting direction, the applicant of the present invention has proposed a head suspension illustrated in FIG. 10.

The head suspension has actuator elements 101a and 101b that deform in response to applied electric power, to move a load beam 105 relative to a base plate 103. Along a side of the base plate 103, a flexure (wiring member) 107 is arranged toward the load beam 105. The flexure 107 is electrically connected through a jumper 109 to the actuator elements 101a and 101b.

The jumper 109 has connectors 111a and 111b connected to the actuator elements 101a and 101b, respectively, an intermediate part 113 extending over a base plate edge 103a of the base plate 103, and a connector 111c connected to the wiring of the flexure 107.

The jumper 109 widens the degree of freedom in choosing a connecting direction between the actuator elements 101a and 101b and the flexure 107. The jumper 109 functions to supply power from the flexure 107 to the actuator elements 101a and 101b.

The jumper 109, however, has a risk of causing a short circuit at the base plate edge 103a.

FIG. 11 is an enlarged sectional view illustrating a part XI of FIG. 10. The jumper 109 is composed of an insulating cover layer 113, a conductor layer 115, an insulating layer 117, and a metal layer 119 laid one on another from a base plate surface 103b side of the base plate 103.

Due to vibration and displacement of the actuator elements 101a and 101b, the insulating cover layer 113 of the jumper 109 wears on the base plate edge 103a, to cause a short circuit.

To reduce the abrasion of the insulating cover layer 113, the metal layer 119 serving as a rigidity backup may be removed to decrease the pressing force of the jumper 109 applied to the base plate edge 103a.

This technique may slow the wearing of the insulating cover layer 113. However, it is impossible to eliminate the risk of causing a short circuit.

If the base plate edge 103a is close to any of the connectors 111a, 111b, and 111c of the jumper 109, the pressing force of the jumper 109 on the base plate edge 103a will not decrease and the insulating cover layer 113 of the jumper 109 will wear to cause a short circuit.

SUMMARY OF THE INVENTION

An object of the present invention is to provide a head suspension having a jumper capable of widening the degree of freedom in choosing a connecting direction between a flexure and an actuator element without abrading an insulating cover layer of the jumper.

In order to accomplish the object, an aspect of the present invention provides a head suspension including a base plate, a load beam, an actuator element configured to deform in response to applied power and thereby move the load beam relative to the base plate, a wiring member arranged along a side of the base plate, and a jumper having a first end electrically connected to the actuator element, an intermediate part extending over a base plate edge of the base plate, and a second end electrically connected to the wiring member, to supply power from the wiring member to the actuator element. The jumper includes an insulating cover layer, a conductor layer, and an insulating layer that are laid one on another from a surface side of the base plate. The conductor layer is diverged in a direction in which the layers of the jumper are laid one on another, to form an escape recess to avoid the base plate edge.

According to this aspect of the present invention, the escape recess of the jumper avoids the base plate edge, so that the insulating cover layer is not abraded by the base plate edge.

The conductor layer is diverged in the direction in which the layers of the jumper are laid one on another, to secure the thickness of the conductor layer at the escape recess. As a result, power is smoothly supplied from the wiring member to the actuator element through the jumper.

In this way, the escape recess formed by diverging the conductor layer in the direction in which the layers of the jumper are laid one on another prevents the insulating cover layer of the jumper from being worn by the base plate edge.

DETAILED DESCRIPTION OF EMBODIMENTS

Figure 1:
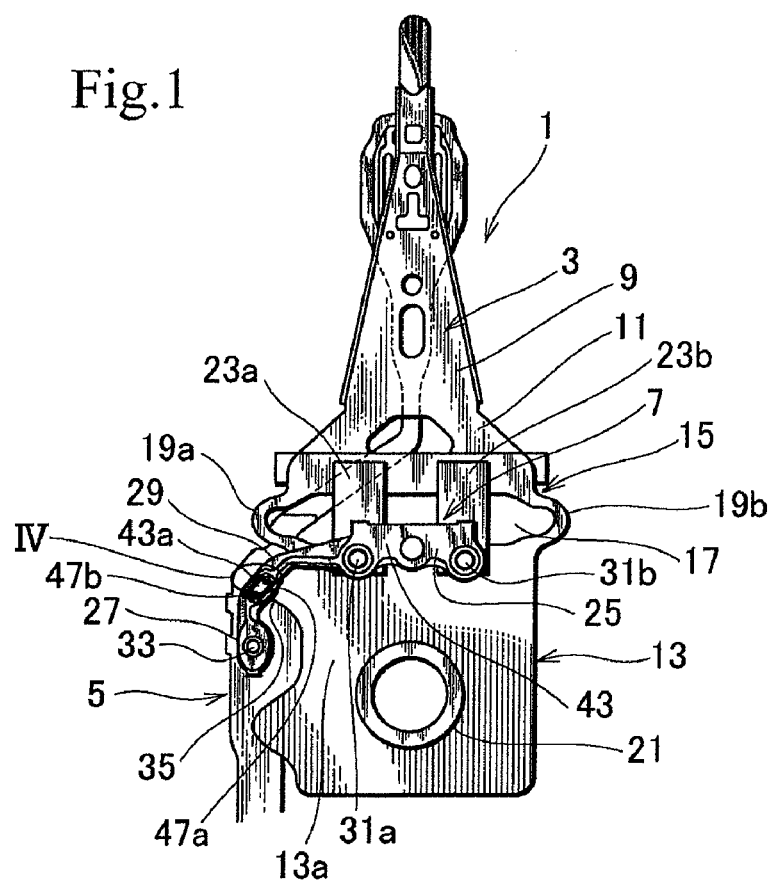
FIG. 1 is a plan view illustrating a head suspension according to a first embodiment of the present invention.
Figure 2:
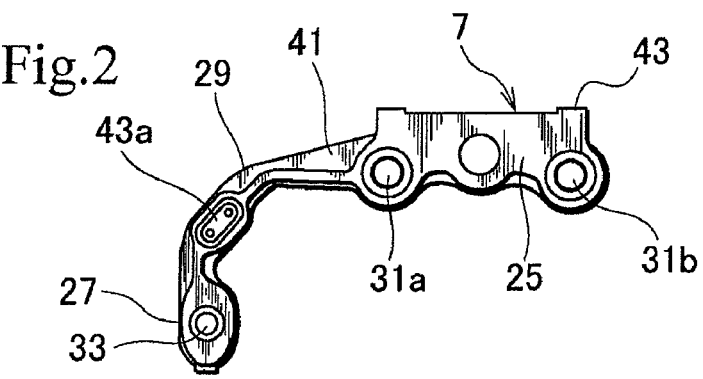
FIG. 2 is a plan view illustrating a jumper of the head suspension of FIG. 1.
Figure 3:
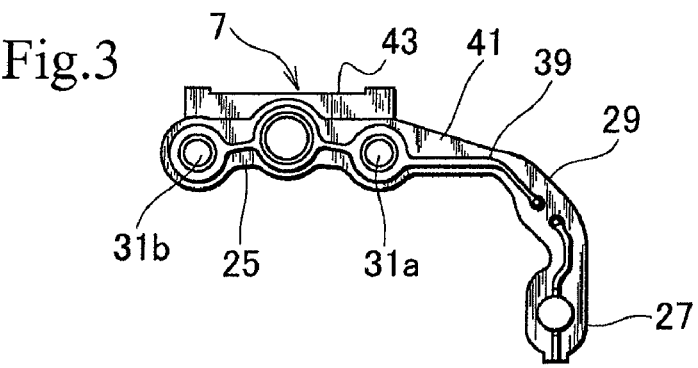
FIG. 3 is a bottom view illustrating the jumper of FIG. 2.
Figure 4:
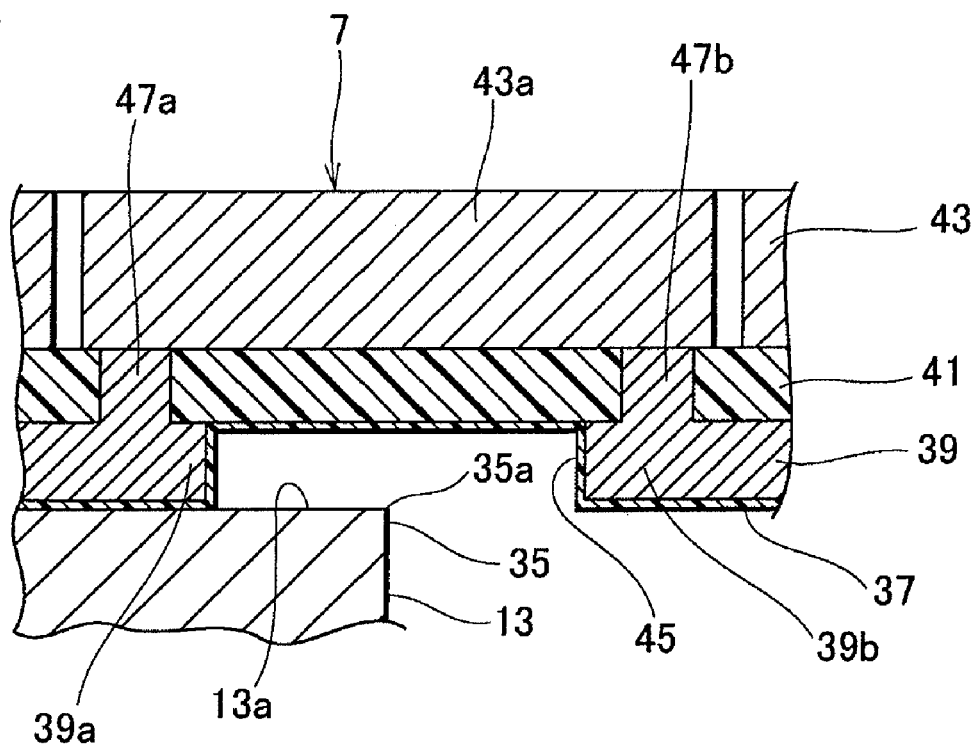
FIG. 4 is an enlarged sectional view of a part IV of FIG. 1.

A head suspension according to a first embodiment will be explained with reference to FIGS. 1 to 4 in which FIG. 1 is a plan view illustrating the head suspension, FIG. 2 is a plan view illustrating a jumper of the head suspension, FIG. 3 is a bottom view illustrating the jumper, and FIG. 4 is an enlarged sectional view of a part IV of FIG. 1.

In FIG. 1, the head suspension 1 has a base plate 13, a load beam 3, a flexure 5 serving as a wiring member, and the jumper 7.

The load beam 3 applies load onto a slider that is arranged at a front end of the load beam 3. The load beam 3 is made of, for example, a stainless steel plate having a thickness in the range of 30 to 150 µm. The load beam 3 has a rigid part 9 and a resilient part 11. The resilient part 11 is fixed to a front end of an actuator support 15 of the base plate 13 by, for example, laser spot welding.

The base plate 13 is made of a metal plate such as a stainless steel plate having a thickness in the range of 150 to 200 µm. The base plate 13 is integral with the actuator support 15. The actuator support 15 and base plate 13 may be discrete parts that are joined together.

The actuator support 15 has an opening 17 and curved flexible parts 19a and 19b defining both sides of the opening 17, respectively. The base plate 13 has a boss 21 to be coupled with an actuator arm connected to a voice coil motor.

The actuator support 15 of the base plate 13 supports a pair of actuator elements 23a and 23b that bridge the opening 17.

The flexure 5 extends along a side of the base plate 13 toward the load beam 3. The flexure 5 has a base made of a metal thin plate that is thinner and more precise than the load beam 3, a read/write signal line (not illustrated) connected to a head attached to the slider of the load beam 3, and a power supply line (not illustrated). The power supply line reaches the portion of the flexure 5 extending along the side of the base plate 13.

In FIGS. 1 to 3, the jumper 7 has an actuator element end 25 on a first end, a flexure end 27 on a second end, and an intermediate part 29 between the first and second ends.

The actuator element end 25 of the jumper 7 is electrically connected to the actuator elements 23a and 23b with conductive adhesives 31a and 31b. It is preferable to electrically connect the actuator element end 25 of the jumper 7 to first ends of the actuator elements 23a and 23b. The flexure end 27 of the jumper 7 is electrically connected to the power supply line of the flexure 5 with a conductive adhesive 33. The actuator elements 23a and 23b are grounded through, for example, conductive adhesives to the actuator support 15.

The intermediate part 29 of the jumper 7 is curved and is extended over a base plate edge 35 of the base plate 13 up to the flexure end 27.

In FIGS. 1 to 4, the jumper 7 has a multilayered structure including an insulating cover layer 37, a conductor layer 39, an insulating layer 41, and a metal layer 43 that are laid one on another from a surface 13a side of the base plate 13. The conductor layer 39 of the jumper 7 is diverged in the direction in which the layers 37, 39, 41, and 43 of the jumper 7 are laid one on another, to form an escape recess 45 that avoids an edge 35a of the base plate edge 35.

The insulating cover layer 37 and insulating layer 41 are made of, for example, polyimide and the conductor layer 39 is made of copper. The metal layer 43 is made of, for example, a stainless sheet.

The divergence of the conductor layer 39 is realized with an island 43a of the metal layer 43 and grounding parts 47a and 47b formed on the conductor layer 39.

The island 43a is formed by separating a part of the metal layer 43 from the remaining part thereof.

The conductor layer 39 is disconnected on each side of the escape recess 45 to form disconnected ends 39a and 39b. The grounding parts 47a and 47b are formed at the disconnected ends 39a and 39b of the conductor layer 39. The grounding parts 47a and 47b protrude from the disconnected ends 39a and 39b of the conductor layer 39 in the direction in which the layers 37, 39, 41, and 43 of the jumper 7 are laid one on another, pass through the insulating layer 41, and electrically connect to the island 43a of the metal layer 43.

The island 43a is formed when the contour of the metal layer 43 is shaped by etching.

Namely, a stainless sheet is coated with polyimide to form the insulating layer 41, the insulating layer 41 is shaped by etching, and the contour of the metal layer 43 is shaped by etching.

The conductor layer 39 is formed by plating the insulating layer 41 and is coated with the insulating cover layer 37.

The jumper 7 with the above-mentioned structure is able to avoid the edge 35a of the base plate edge 35 with the help of the escape recess 45, thereby avoiding abrasion of the insulating cover layer 37.

As a result, the insulating cover layer 37 secures an insulating ability and prevents a short circuit for a long time.

The conductor layer 39 is diverged in the direction in which the layers 37, 39, 41, and 43 of the jumper 7 are laid one on another, with the use of the grounding parts 47a and 47b having the same thickness as the conductor layer 39 and the island 43a of the metal layer 43, and therefore, the conductor layer 39 secures a sufficient thickness regardless of the escape recess 45. As a result, power is smoothly supplied from the flexure 5 to the actuator elements 23a and 23b through the jumper 7.

In response to the supplied power, the actuator elements 23a and 23b slightly deform to minutely move the head of the load beam 3 in a sway direction relative to the base plate 13.

As mentioned above, the head suspension 1 according to the first embodiment has the base plate 13, the load beam 3, the actuator elements 23a and 23b that deform in response to applied power and move the load beam 3 relative to the base plate 13, the flexure (wiring member) 5 arranged along a side of the base plate 13, and the jumper 7 having the first end electrically connected to the actuator elements 23a and 23b, the intermediate part extending over the base plate edge 35 of the base plate 13, and the second end electrically connected to the power supply line of the flexure 5, to supply power to the actuator elements 23a and 23b. The jumper 7 includes the insulating cover layer 37, conductor layer 39, insulating layer 41, and metal layer 43 that are laid one on another from the surface 13a side of the base plate 13. The conductor layer 39 is diverged in the direction in which the layers 37, 39, 41, and 43 of the jumper 7 are laid one on another, to form the escape recess 45 to avoid the edge 35a of the base plate edge 35.

The escape recess 45 of the jumper 7 avoids the edge 35a of the base plate edge 35, so that the insulating cover layer 37 does not hit the edge 35a even if vibration occurs or the actuator elements 23a and 23b displace.

This configuration reduces the wearing of the insulating cover layer 37 due to the edge 35a and prevents a short circuit.

If the edge 35a is close to an electrical connecting part such as the conductive adhesive 31a, 31b, or 33 of the jumper 7, pressing force by the metal layer 43 onto the jumper 7 will increase in the vicinity of the edge 35a. Even in such a case, the configuration of the first embodiment prevents the edge 35a from abrading the insulating cover layer 37. Accordingly, the pressing force by the metal layer 43 effectively works to suppress vibration of the jumper 7.

Since the conductor layer 39 is diverged in the direction in which the layers 37, 39, 41, and 43 of the jumper 7 are laid one on another, the conductor layer 39 secures a sufficient thickness regardless of the escape recess 45, to smoothly supply power from the flexure 5 to the actuator elements 23a and 23b through the jumper 7.

Figure 5:
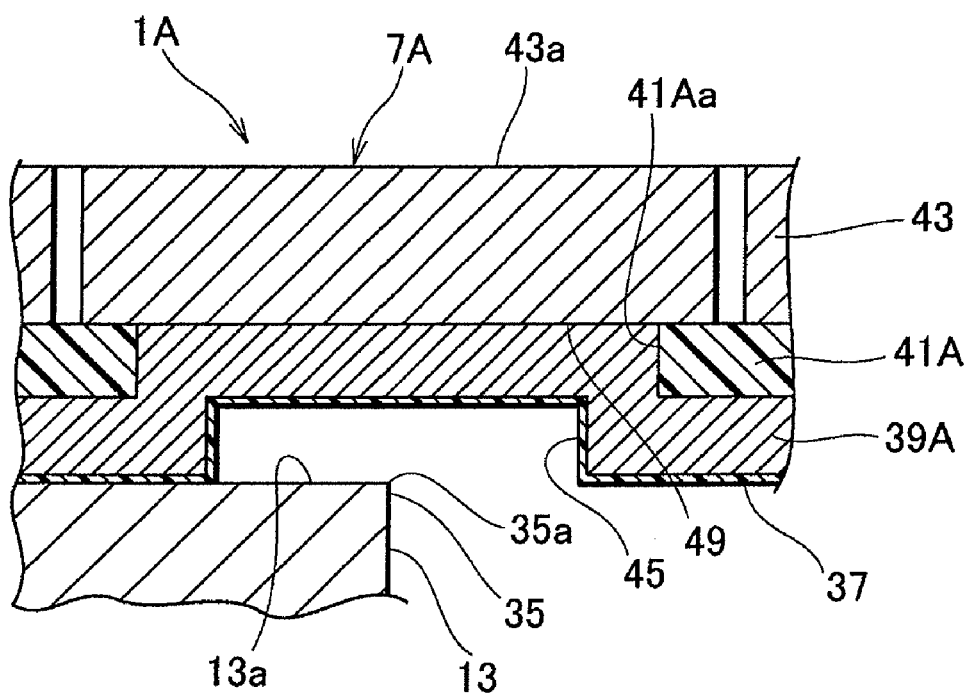
FIG. 5 is an enlarged sectional view at a part corresponding to the part of FIG. 4, illustrating a jumper of a head suspension according to a second embodiment of the present invention.

A jumper of a head suspension according to a second embodiment of the present invention will be explained with reference to FIG. 5 that is an enlarged sectional view illustrating a part corresponding to the part of FIG. 4. The second embodiment is basically the same as the first embodiment, and therefore, the same or corresponding parts are represented with the same reference marks or the same reference marks plus "A" to avoid repetitive explanations.

According to the second embodiment, the head suspension 1A has the jumper 7A having a divergence recess 49 comprising an island 43a separated from a metal layer 43 and a removal 41Aa of an insulating layer 41A.

Namely, a conductor layer 39A and an insulating cover layer 37 of the jumper 7 are bent along the divergence recess 49, so that the conductor layer 39A is diverged within the divergence recess 49.

According to the second embodiment, the divergence recess 49 forms an escape recess 45 to provide the same effect as the first embodiment.

According to the second embodiment, the conductor layer 39A in the divergence recess 49 secures a sufficient thickness to smoothly supply power from a flexure 5 to actuator elements 23a and 23b of the head suspension 1A through the jumper 7.

Figure 6:
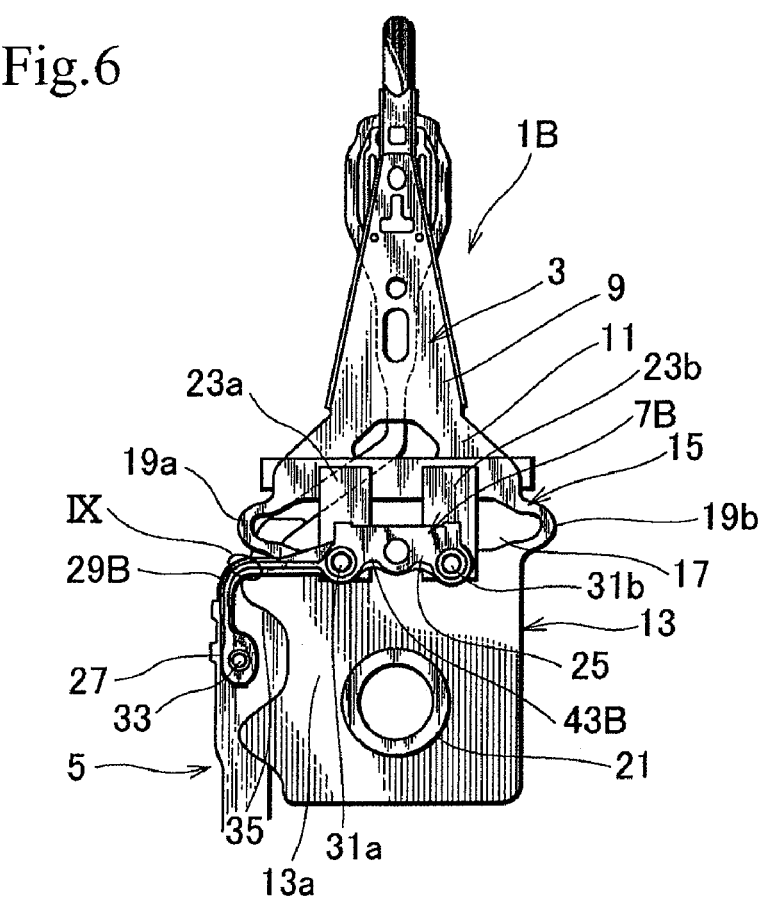
FIG. 6 is a plan view illustrating a head suspension according to a third embodiment of the present invention.
Figure 7:
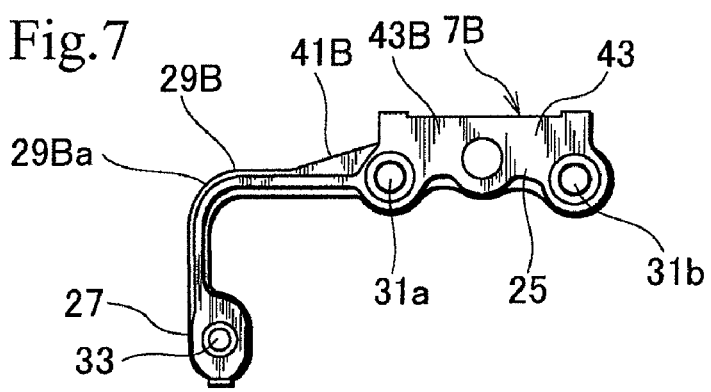
FIG. 7 is a plan view illustrating a jumper of the head suspension of FIG. 6.
Figure 8:
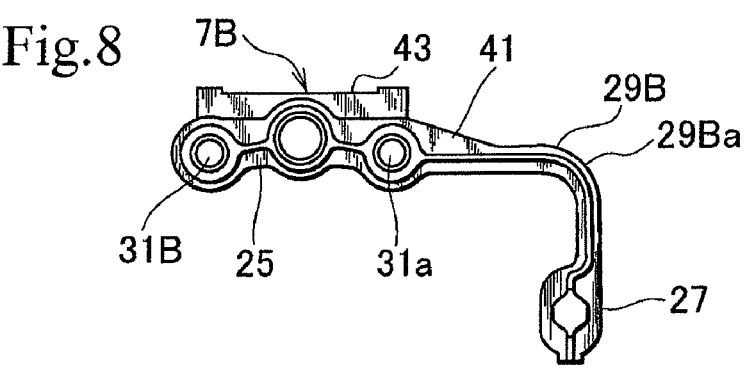
FIG. 8 is a bottom view illustrating the jumper of FIG. 7.
Figure 9:
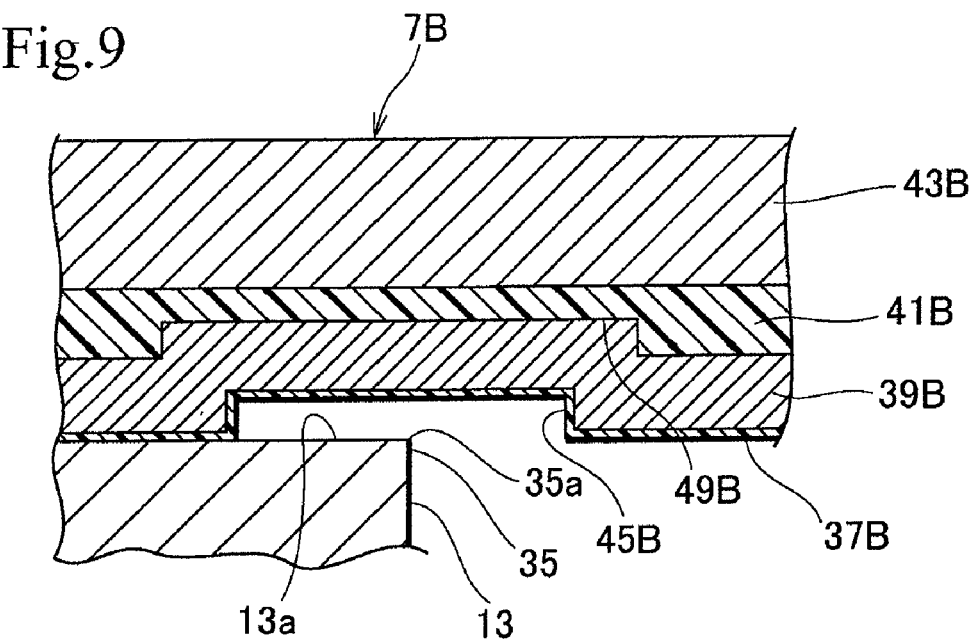
FIG. 9 is an enlarged sectional view illustrating a part IX of FIG. 6.
Figure 10:
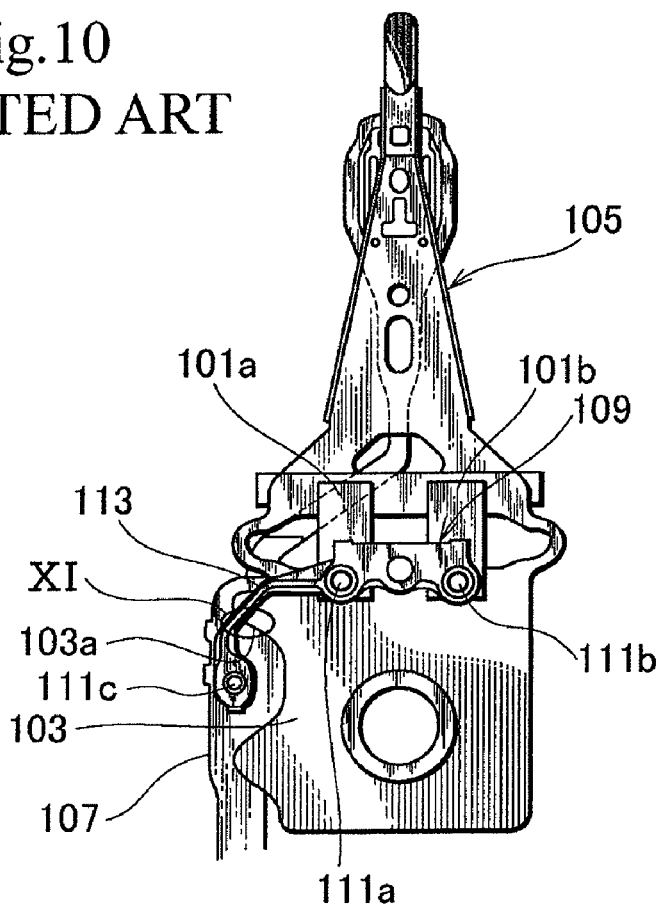
FIG. 10 is a plan view illustrating a head suspension according to a related art.
Figure 11:
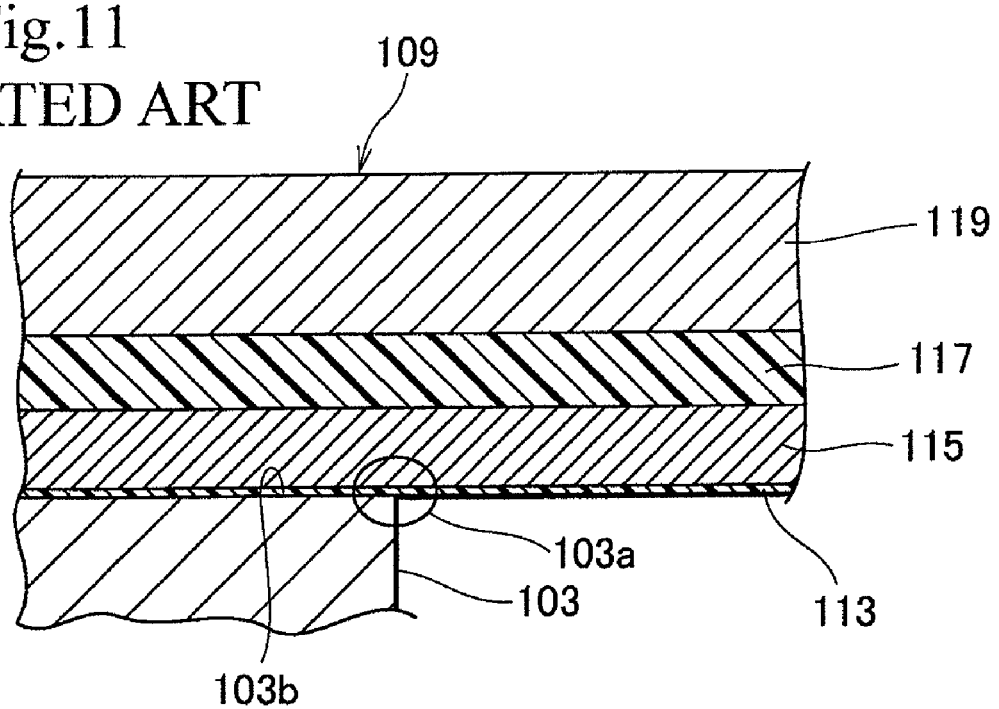
FIG. 11 is an enlarged sectional view illustrating a part XI of FIG. 10.

A jumper of a head suspension according to a third embodiment of the present invention will be explained with reference to FIGS. 6 to 9 in which FIG. 6 is a plan view of the head suspension, FIG. 7 is a plan view of the jumper, FIG. 8 is a bottom view of the jumper, and FIG. 9 is an enlarged sectional view illustrating a part IX of FIG. 6. The third embodiment is basically the same as the first embodiment, and therefore, the same or corresponding parts are represented with the same reference marks or the same reference marks plus "B" to avoid repetitive explanations.

According to the third embodiment, the head suspension 1B has the jumper 7B having an intermediate part 29B substantially bent at a right angle through a curve 29Ba. The curve 29Ba relaxes tension, thereby slightly weakening a pressing force of the intermediate part 29B of the jumper 7B in the vicinity of an edge 35a of a base plate edge 35.

In FIG. 9, a conductor layer 39B of the jumper 7B is diverged within a divergence recess 49B that is formed by partly thinning an insulating layer 41B of the jumper 7B. The conductor layer 39B and an insulating cover layer 37B of the jumper 7B are bent along the divergence recess 49B.

The divergence recess 49B forms an escape recess 45B to provide the same effect as the first embodiment.

According to the third embodiment, the escape recess 45B is slightly narrower than those of the other embodiments. The third embodiment, however, weakens a pressing force of the intermediate part 29B of the jumper 7B in the vicinity of the edge 35a of the base plate edge 35. Accordingly, the escape recess 45B substantially provides the same effect as the first embodiment.

In any one of the embodiments, the actuator support 15 may separately be prepared from the base plate 13. In this case, a relationship between the base plate edge and the escape recess will be changed to a relationship between an edge of another part such as an edge of the actuator support 15 and the escape recess.

The stress relieving structure of the intermediate part 29B of the jumper 7B according to the third embodiment is applicable to the first and second embodiments.

In FIG. 9 of the third embodiment, the metal layer 43B may be omitted and the intermediate part 29 of the jumper 7 of the first embodiment may be employed instead of the intermediate part 29B. In this case, the pressing force of the intermediate part of the jumper in the vicinity of the base plate edge is slightly weakened, so that the shallow escape recess 45B substantially provides the same effect as the first embodiment.

Namely, each of the escape recesses 45, 45A and 45B may be freely combined with one of the jumper 7, 7A, 7B.

Further, in the second embodiment, even if the metal layer 43 is omitted, it merely removes the bottom surface of the divergence recess 49 and substantially provides the same effect as the first embodiment.

Namely, the multilayered structure of the jumper according to the present invention only has to comprise at least the insulating cover layer, the conductor layer, and the insulating layer that are laid one on another from a surface 13a side of the base plate 13 as the second and third embodiments.

What is claimed is:

1. A head suspension having a base plate and a load beam comprising:
   an actuator element configured to deform in response to applied power and thereby move the load beam relative to the base plate;
   a wiring member arranged along a side of the base plate;
   a jumper having a first end electrically connected to the actuator element, an intermediate part extending over a base plate edge of the base plate, and a second end electrically connected to the wiring member, to supply power from the wiring member to the actuator element;
   the jumper including an insulating cover layer, a conductor layer, and an insulating layer that are laid one on another from a surface side of the base plate; and
   the conductor layer being diverged in a direction in which the layers of the jumper are laid one on another, to form an escape recess to avoid the base plate edge.

2. The head suspension of claim 1, wherein the jumper further comprises:
   a metal layer laid on the insulating layer opposite to the surface of the base plate;
   an island formed by separating a part of the metal layer;
   a disconnected end formed by disconnecting the conductor layer on each side of the escape recess; and a grounding part formed at each disconnected end of the conductor layer, so that the grounding part passes through the insulating layer and electrically connects with the island of the metal layer thereby realizing the divergence of the conductor.

3. The head suspension of claim 2, wherein the jumper further comprises:

a divergence recess formed with the island separated from the metal layer and a partial removal of the insulating layer; and the divergence of the conductor layer is realized within the divergence recess.

4. The head suspension of claim 2, wherein the jumper further comprises:

a divergence recess that is formed by partly thinning the insulating layer; and the divergence of the conductor layer is realized within the divergence recess.

5. The head suspension of claim 1, wherein the jumper further comprises:

a divergence recess that is formed by partly thinning the insulating layer; and the divergence of the conductor layer is realized within the divergence recess.

* * * * *